United States Patent
Alkhazov (10) Patent No.: US 8,486,365 B2
(45) Date of Patent: Jul. 16, 2013

(54) PROCESS OF CONVERSION OF HYDROGEN SULFIDE INTO ELEMENTAL SULFUR ON SOLID OXIDE CATALYSTS

(76) Inventor: Tofik Gasan Alkhazov, Encino, CA (US)

( * ) Notice: Subject to any disclaimer, the term of this patent is extended or adjusted under 35 U.S.C. 154(b) by 0 days.

(21) Appl. No.: 13/436,959

(22) Filed: Apr. 1, 2012

(65) Prior Publication Data

US 2012/0251436 A1  Oct. 4, 2012

Related U.S. Application Data

(60) Provisional application No. 61/516,249, filed on Apr. 1, 2011.

(51) Int. Cl.
   *C01B 17/04*   (2006.01)
(52) U.S. Cl.
   USPC ............... 423/573.1; 423/574.1; 423/576.8
(58) Field of Classification Search
   USPC .................. 423/573.1, 574.1, 576.8
   See application file for complete search history.

(56) References Cited

U.S. PATENT DOCUMENTS

| | | | | |
|---|---|---|---|---|
| 3,532,468 A * | 10/1970 | Beavon | ............ | 423/574.1 |
| 3,592,602 A * | 7/1971 | Palm | ............ | 423/574.1 |
| 4,279,882 A * | 7/1981 | Beavon | ............ | 423/574.1 |
| 5,262,135 A * | 11/1993 | Lell et al. | ............ | 423/220 |
| 7,226,572 B1 * | 6/2007 | Keller et al. | ............ | 423/573.1 |

* cited by examiner

Primary Examiner — Timothy Vanoy (57) ABSTRACT

To minimize the inhibitory effect of sulfur on the oxidation of hydrogen sulfide with oxygen in a gas stream on the solid catalysts, first, the elemental sulfur content in the gas stream is reduced to less than 3.0 mg/l, preferably 0.3 mg/l, and second, the temperature in the oxidation reactor is maintained so that the relative vapor pressure of sulfur in it remains less than 0.25, preferably less than 0.1. The removal of sulfur from the gas stream by washing it with water or aqueous solution decreases the ignition temperature of the process to 155-160° C. Because of this the initial concentration of $H_2S$ might be elevate up to about 2% for a regular adiabatic reactor and to 10% by volume for a reactor with a heat-redistributing system.

20 Claims, 7 Drawing Sheets

Implementation of the Invention for the oxidation of Hydrogen sulfide of the "lean" gases Fig. 1 Flow diagram of Oxidation Section of the proposed process Fig. 2 Sketch of the reactor with a heat-redistributing system (HRS)

Fig. 3 Implementation of the Invention in Shifted Claus Process

Fig. 4 Implementation of the Invention in Shifted Claus Processes with irreversible extraction of sulfur dioxide Fig. 5 Implementation of the Invention in Claus Processes with a Hydrogenation Stage Fig. 6 Implementation of the Invention in Claus Processes with Reversible extraction of sulfur dioxide Fig. 7 Implementation of the Invention for the oxidation of Hydrogen sulfide of the "lean" gases

PROCESS OF CONVERSION OF HYDROGEN SULFIDE INTO ELEMENTAL SULFUR ON SOLID OXIDE CATALYSTS

CROSS REFERENCE TO RELATED APPLICATIONS

Provisional application No. 61/516,249, filed Apr. 1, 2011

STATEMENT REGARDING FEDERALLY SPONSORED RESEARCH OR DEVELOPMENT

Not Applicable

REFERENCE TO SEQUENCE LISTINGS, A TABLE, OR COMPUTER PROGRAM LISTING COMPACT DISC APPENDIX

Not Applicable

BACKGROUND OF THE INVENTION

The present invention relates to the processes for sulfur recovery from the hydrogen sulfide ($H_2S$) containing gases, using the catalytic conversion of $H_2S$ to elemental sulfur on the solid catalysts. In the practice, these processes are exploited for production of commercial sulfur and/or for reduction of the hazardous discharges of sulfur compounds into the atmosphere.

The main contemporary process widely used for sulfur recovery from the $H_2S$-containing gases is the Claus process, named so in honor of Carl Friedrich Claus, a German chemist who in the second half of the XIX century worked in England. He was the first who used a catalytic reaction for conversion of hydrogen sulfide into elemental sulfur by its oxidation with oxygen of the ambient air over the solid catalysts. The catalyst for the process was a bog iron ore. The process was conducted in the adiabatic reactors. In 1883, the British patent office granted him a patent on this process.

The oxidation of hydrogen sulfide to sulfur ($S_n$) with oxygen proceeds in accordance with thermochemical equation 1:

$$H_2S + 1/2 O_2 = 1/n S_n + H_2O + \Delta H_1 \quad [1]$$

In this equation, "n" is an average number of sulfur atoms in the sulfur molecules formed in the reaction. For the sulfur molecules in a gas phase, this number varies from 1 to 8, depending on the temperature, and when the temperature rises, "n" decreases. At the temperatures lower than 300° C., in the gas phase, only $S_6$ and $S_8$ are thermodynamically stable. In the range of 150-300° C., the average value of "n" is about 7.5.

The $\Delta H_1$ is a heat of reaction 1; at 250° C., $\Delta H_1 = -49.6$ kcal per mole of $H_2S$. Because of this reaction heat, oxidation of one mole of hydrogen sulfide in 100 moles of a gas mixture causes an increase in temperature of the gas mixture of 65-70° C. The free energy $\Delta G_1$ (Gibbs energy) of reaction 1 has a big negative value. At 250° C., $\Delta G_1 = -41$ kcal per mole of $H_2S$. Therefore, this reaction is irreversible, which means that theoretically hydrogen sulfide could be completely converted to sulfur by this reaction.

In the process of the catalytic oxidation of hydrogen sulfide, not only elemental sulfur but also sulfur dioxide ($SO_2$) is formed, according to the following reactions:

$$H_2S + 3/2 O_2 = SO_2 + H_2O + \Delta H_2 \quad [2]$$

$$1/n S_n + O_2 = SO_2 + \Delta H_3 \quad [3]$$

At 250° C., $\Delta H_2 = -124$ kcal per mole of hydrogen sulfide and $\Delta H_3 = -75$ kcal per mole of sulfur dioxide formed. The reactions 2 and 3 are irreversible because of their big negative Gibbs energies: At 250° C., $\Delta G_2 = -113$ kcal and $\Delta G_3 = -72$ kcal per mole of sulfur dioxide formed. At temperatures 290° C. and higher, both of these reactions proceed with fast increasing rates.

Because of the high exothermicity, the Claus method in its original mode (in an adiabatic reactor) is not suitable for treating the gases with the $H_2S$ concentration more than 2.0% by volume. For this reason in 1936, I.G. Farbenindustrie A. G. (a German conglomerate of chemical companies) introduced a multi-stage Claus process, which is fit to treat the gases with much higher concentrations of $H_2S$ (more than 20% by volume) and which up to now remains a cornerstone of the existing versions of the Claus process. The classic Claus process includes a thermal (non-catalytic) stage and two or three catalytic stages, in which hydrogen sulfide reacts with sulfur dioxide, formed in the thermal stage, in accordance to reaction 4.

$$2 H_2S + SO_2 \leftrightarrow 3/n S_n + 2 H_2O + \Delta H_4 \quad [4]$$

At 250° C., $\Delta H_4 = -24$ kcal and $\Delta G_4 = -11$ kcal per mole of sulfur dioxide. The maximal sulfur recovery in the Claus processes is determined by the thermodynamics of the reversible reaction 4 and cannot exceed 98%. In practice, the sulfur recovery efficiency (SRE) of the Claus processes with two catalytic stages is not more than 95% and with three catalytic stages is about 97%.

At the same time in the USA, the current national emission standards for big sulfur recovery plants is set as low as 250 ppm of sulfur dioxide (on a basis of zero excess air and no moisture), which means that the SRE of the large Claus plants should be at the level of 99.9% and higher. That is why the tail gases of the modern Claus units must be additionally cleaned up before they are discharged into the atmosphere. According to Goar B. G. and Sames J. A. (see Sulfur Recovery, p. 8-3), there are over sixteen commercialized tail gas clean up (TGCU) processes, which are known to those skilled in the art. Many of the TGCU units can comprise the following catalytic stages:

Selective oxidation of hydrogen sulfide to elemental sulfur, e.g. Selectox, SuperClaus, and Hi-Activity processes Hydrogenation (reduction) of all sulfur compounds, including sulfur dioxide, to hydrogen sulfide, e.g. SCOT (Shell Claus Off-gas Treating) and BSR (Beavon Sulfur Removal) processes Both hydrogenations of sulfur compounds and consecutive selective oxidation of the formed hydrogen sulfide, e.g. BSR/Selectox, BSR/Hi-Activity, PROClaus, and Euro-Claus.

The named catalytic stages can be followed with absorption (reversible or irreversible) of $SO_2$, by the aqueous solutions with pH more than 7 (seven). Many TGCU processes are described in the book *Gas Purification*, by Arthur Kohl et al., in the review *Tail Gas Clean-up Processes* by Goar B. G. and Sames J. A. (see Sulfur *Recovery*, pp. 8.3-8.30), and in numerous patents.

The first commercialized TGCU method using a heterogeneous catalytic oxidation of hydrogen sulfide with oxygen of the air on a solid catalyst, Selectox-32, was developed and tested by Ralph M. Parsons Co. at the end of the 1970s. The catalytic oxidation of $H_2S$ was conducted at the second stage of the two-stage BSR/Selectox process, in a two-bed catalytic reactor with a cooling coil positioned between the catalyst beds. In the BSR/Selectox method, the tail gas first passes through the BSR hydrogenation reactor, where supposedly all sulfurous compounds are reduced to hydrogen sulfide over cobalt-molybdate catalyst. Then the gas stream is freed from the most part of water, passing a direct-contact quench tower. The water vapors content decreases to about 5% by volume. The "dried" tail gas is mixed with the air, reheated and enters the Selectox reactor.

Even though the Selectox process is frequently named a direct oxidation of hydrogen sulfide to elemental sulfur, actually in this process $H_2S$ is not oxidized directly to sulfur. Actually, in the upper catalyst bed, one third of the hydrogen sulfide is oxidized with the admixed oxygen to sulfur dioxide (reaction 2). In the bottom catalyst bed, the formed sulfur dioxide reacts with the remained amount of hydrogen sulfide (reaction 4). The amount of air admixed to the gas must provide the ratio of $H_2S/SO_2=2$, as strict as possible, because this ratio is optimal for the classic Claus reaction. Passing through the cooling coil, the gas is cooled so that the conditions in the bottom catalyst bed become thermodynamically more suitable for the Claus reaction 4. The conversion of hydrogen sulfide into elemental sulfur in the BSR/Selectox process is determined by the equilibrium of reversible reaction 4 and cannot exceed the thermodynamical limit. Therefore, in the Selectox reactor, only about 80% of hydrogen sulfide converts into elemental sulfur. In order to avoid these thermodynamic limits, it is necessary to use the catalysts which are active in the selective oxidation of hydrogen sulfide to elemental sulfur and inactive (or almost inactive) in the Claus reaction.

In the last decades, a number of solid oxide catalysts have been developed for the selective oxidation of hydrogen sulfide to elemental sulfur in gas phase. Many of them are described, for example, in our book *Sulfur Compounds of Natural Gases and Oils*, pp. 109-126, in Van den Brick's monograph *The Selective Oxidation of Hydrogen Sulfide to Elemental Sulfur on Supported Iron-Based Catalysts*, in our article *Catalytic Oxidation of Hydrogen Sulfide of Natural Gas*, and in the following U.S. Pat. Nos. 4,374,819; 4,519,992; 4,576,925; 4,818,740; 4,886,649; 4,988,494; 5,512,260; 5,597,546; 5,603,913; 5,700,440; 5,891,415; 5,965,100; 6,017,507; 6,083,473; 6,099,819; 6,207,127; 6,506,356; 6,919,296.

Among the solid catalysts recommended for the selective oxidation of hydrogen sulfide, the iron-zinc-oxide catalyst, developed and described by us in U.S. Pat. Nos. 5,603,913 and 5,891,415, up to now is the best solid catalyst for oxidation of hydrogen sulfide to elemental sulfur. Now it is known as the Hi-Activity catalyst. It is practically inactive in the reverse Claus reaction; therefore, it can provide complete oxidation of hydrogen sulfide. At full oxidation of hydrogen sulfide, the selectivity of its oxidation to elemental sulfur reaches 96-97%, which is certainly much better than the selectivity of the Selectox, SuperClaus, and other known catalysts.

However, when the Selectox catalyst in the BSR/Selectox unit was replaced with the Hi-Activity catalyst, the following unpredicted facts were observed:

The oxidation of hydrogen sulfide on the Hi-Activity catalyst in the Selectox reactor, which was located after a direct-contact quench tower, started at the temperatures as low as 155-160° C., while in the regular (small) laboratory reactors this happened at much higher temperatures;

If the gas stream before the oxidation reactor bypassed the direct-contact quench tower, the initiation temperature of the hydrogen sulfide oxidation on the Hi-Activity catalyst significantly increased (up to 200° C.);

Cooling the gas stream in the reactor with the cooling coil of the Selectox reactor impeded full oxidation of hydrogen sulfide on the Hi-Activity catalyst in spite of the fact that the temperature in the reactor remained higher than the dew point of sulfur.

Such unusual performance of the Hi-Activity catalyst in the Selectox reactor evidenced that some nuances of the process remained unknown and consequently was not taken into account.

A similar situation has taken place in the SuperClaus process, patented in 1987 by VEG-Gasinstitute N.V. and Comprimo, B.V (U.S. Pat. No. 4,988,494). At the last stage of this process, hydrogen sulfide is selectively oxidized to elemental sulfur on the iron-oxide-containing catalysts. According to Jacobs Comprimo, now about 200 SuperClaus units are used or are in construction worldwide. In all of these units, the concentration of $H_2S$ in the inlet gas of the oxidation reactor is 0.8-1.0%, the initiation temperature of the oxidation is about 200° C., and the conversion of $H_2S$ into elemental sulfur is at the level of 85%. At the same time, the results of the laboratory study presented by P. J. van den Brink in his monograph *The Selective Oxidation of Hydrogen Sulfide to Elemental Sulfur on Supported Iron-Based Catalysts* shows that the oxidation of hydrogen sulfide on the SuperClaus catalysts starts at the temperatures as low as 160° C., even when the space velocity is as high as 12,000 $h^{-1}$. These discrepancies between the catalyst performances in the laboratory and industrial units indicate that some unknown nuances of the process have not been taken into account on the transfer from the laboratory experiments to the industrial realization of the SuperClaus process.

In 2000, two new TGTU processes, namely PROClaus and EuroClaus, were presented. In these processes, sulfur dioxide is hydrogenated to hydrogen sulfide on the solid oxide catalysts in the last Claus reactor, concurrently with the Claus reaction.

The first information about PROClaus (Parsons RedOx Claus) process was presented at the Laurence Reid Gas Conditioning Conference in February 2000. The process is now protected by U.S. Pat. No. 6,214,311, which was filed in September 1998 and issued in April 2001. A complex oxide catalyst used in this process, comprising oxides of Fe, Co, Ni, Cr, Mo, Mn, Se, Cu, and Zn on alumina support, is active in both hydrogenation (reduction) of sulfur dioxide and Claus reaction. The catalyst can be used either instead of a common Claus catalyst or in combination with the Claus catalyst immediately following it in the last Claus reactor.

According to the patent, the laboratory study of the PROClaus process was carried out in a quartz isothermal reactor at the temperatures 200-340° C. and space velocity 1,000 $h^{-1}$. The inlet gas mixtures simulated the effluent gases of the first and second Claus reactors. The first mixture contained 0.92% of $SO_2$, 1.84% of $H_2S$, 33% of $H_2O$, 1.7% of $H_2$, and 0.08% of CO. The second one contained 0.32% of $SO_2$, 0.65% of $H_2S$, 35% of $H_2O$, 1.7% of $H_2$, and 0.08% of CO. It is essential that the used mixtures did not contain elemental sulfur. In the laboratory study, sulfur dioxide was almost completely (95-97%) reduced to elemental sulfur and hydrogen sulfide, so that $SO_2$ concentration in the effluent gas of the reactor imitated the last Claus reactor dropped to 0.03-0.05%. Such a gas could be directed into a catalytic oxidation reactor for the selective oxidation of hydrogen sulfide to elemental sulfur. According to the calculations of the inventor, the process should provide the overall sulfur recovery of the Claus plant equal 99.5%.

However, an attempt to use the PROClaus process in an industrial unit has failed. The sulfur dioxide concentration in the effluent gas of the Claus reactor contained the patented catalyst was as high as it was after the regular Claus reactors. It is clear that in this case some important but unknown peculiarities of the catalytic reaction were not taken into account too. Moreover, they have never been discussed.

The EuroClaus (Extremely Upgraded Reduction Oxidation) process was developed by Jacobs Comprimo Co., Netherlands, and first was described in *Sulphur* Magazine, No. 270, in October 2000. The process presents a further improvement of the SuperClaus process. Similarly to the Superclaus, in the EuroClaus process, hydrogen sulfide is burned in the reaction furnace of a Claus plant with a substoichiometric amount of air in order to suppress the formation of sulfur dioxide. The small residual amount of sulfur dioxide in the gas stream after the last Claus stage is hydrogenated into $H_2S$ on the pre-sulfided oxide catalyst, a thin layer of which is placed in the bottom section of the last Claus reactor. Then, the formed hydrogen sulfide is selectively oxidized to sulfur in the oxidation reactor on the Superclaus catalyst. The calculated overall sulfur recovery efficiency of the EuroClaus process should be up to 99.7%.

However, similarly to PROClaus process, the EuroClaus could not provide the calculated SRE in the industrial units— the concentration of sulfur dioxide after the last Claus reactor with the hydrogenation catalyst remained too high. It is likely that in this case too some unknown details of the hydrogenation reaction were not taken into account in transfer from the laboratory tests to the industrial scale. The inventors of the EuroClaus process later admitted that the conduction of the hydrogenation (reduction) of $SO_2$ in the same reactor with the last Claus stage has no sense. In U.S. Pat. No. 6,800,261 (filed in Aug. 12, 2002 and published in May 10, 2004), they noted that "for extremely high $SO_2$ conversion and minimum loss of sulfur recovery a separate reduction reactor with a preceding condenser is preferred over an integrated reactor, filled with two stacked layers of respectively a Claus catalyst and a reduction catalyst." The reasons of the observed discrepancy were not discussed.

OBJECTIVES AND BRIEF SUMMARY OF THE INVENTION

The presented above analysis of the invention's background shows that in many cases the catalytic reactions, such as selective oxidation of hydrogen sulfide and hydrogenation of sulfurous compounds, used to boost efficiency of the Claus process turned out to be unable to increase it in the degree predicted by the results of the laboratory studies. In this connection, the main objective of the present invention was to reveal the reasons of such discrepancies and to find the ways to overcome the obstacles preventing full use of the developed catalysts' potentials.

I have thoroughly explored this problem and have found that
- Oxidation of hydrogen sulfide on the solid catalysts, including the Fe—Zn-oxide catalysts, is inhibited by adsorption of sulfur vapors on the catalysts;
- Hydrogenation (reduction) of sulfur compound on the solid catalysts, including the Co—Mo-oxide on alumina support catalyst, is inhibited by adsorption of sulfur vapors on the catalysts;
- The inhibition of the both said catalytic reactions by sulfur vapor occurs even when the condensation of sulfur vapors is impossible. Both of these catalytic reactions are entirely ceased when the sulfur pressure over the catalysts is three-four times lower than the saturated vapor pressure of sulfur.
- The reactors used to conduct the said reactions in the industrial units were chosen without considering the inhibitory effect of sulfur vapors, which was not known that time.

On the ground of these findings, I propose the processes for recovery sulfur from the hydrogen sulfide containing gases in which the catalytic reactions are conducted in the conditions that exclude their strong inhibition by sulfur, i.e. when the sulfur relative vapor pressure $P/P_s$ is lower than 0.25, preferably lower than 0.1. Here P is the partial pressure of sulfur vapor in a gas mixture and $P_s$ is the saturated vapor pressure of sulfur at the temperature of the gas mixture. I also propose to use in the industrial units the fixed-bed catalytic reactors with inner heat-redistributing systems, which previously never used in the catalytic oxidation of hydrogen sulfide.

BRIEF DESCRIPTION OF DRAWINGS

The following three figures demonstrate implementations of the present invention in different multistage sulfur recovery processes comprising a stage of hydrogen sulfide oxidation on the solid catalyst, such as:
The Shifted Claus Process (FIG. 3);
The Claus process with irreversible extraction of sulfur dioxide from the tail gas (FIG. 4);
The Claus process with a hydrogenation stage (FIG. 5).

DETAILED DESCRIPTION OF THE INVENTION

Technical Problems

The scrutiny of the patent and non-patent literature on catalytic oxidation of hydrogen sulfide and hydrogenation of sulfur dioxide on the solid catalysts brought me to a thought that the both of these reactions are inhibited by elemental sulfur. Before this invention, it was believed that only the condensation of sulfur vapors could affect these catalytic processes. Any alternative ways of possible negative effluence of sulfur vapors on these processes was never considered. That is why the idea of the inhibition by sulfur should be first examined and confirmed by experiments. I have done this in a special laboratory study and its results are described below.

The second idea, appeared from the analysis of the available data, was that the industrial reactors used for catalytic oxidation of hydrogen sulfide and hydrogenation of sulfur dioxide on the solid catalysts were not quite suitable for these reactions. This idea should be analyzed and confirmed, too. I have done this using the results of my laboratory study and the experimental data from the literature.

The possibility of inhibition of the catalytic oxidation of hydrogen sulfide by sulfur vapor was studied in a special laboratory unit consisted of the following sections—preparation, reaction, and analysis. In the first section, the calculated amount of hydrogen sulfide was added to the nitrogen stream containing 1.8% oxygen by volume. The gas mixture passed through a vessel with liquid sulfur maintained at a given constant temperature. The concentration of sulfur vapor in the mixture was calculated on the basis of the pressure of saturated vapor of sulfur. The gas mixture of $H_2S$, $O_2$, $S_n$, and $N_2$ entered the second section comprising a so-called one-row quartz reactor with inner diameter 6 mm and length 50 cm. The reactor was packed with the cylindrical granules of the iron-zinc-oxide catalyst described in our U.S. Pat. No. 5,891,415. The reactor was placed in a tubular isothermal furnace. The gas after the reactor passed through a glass with $CaCl_2$ to be freed from water and sulfur. In the last section, the inlet and effluent gases were analyzed using the chromatographs.

The results of these experiments are shown in Tables 1-3. In all of these experiments, the space velocity (adjusted for the standard conditions) is 3000 h$^{-1}$. Elemental sulfur contents in the gas stream are presented in mg/l, that is, milligrams of elemental sulfur contained in one liter of the gas at the standard conditions. In this Description, "calculated at the standard condition" means that one gram-mole of the gas stream occupies a volume equal to 22.4 liters. The partial pressure of sulfur ($S_n$) in the gas stream P and the saturated vapor pressure of sulfur at the temperature of the gas stream $P_s$ are presented in Pa (pascal).

Total conversion of $H_2S$ is calculated as $100\times(H_2S_{in}-H_2S_{out})/H_2S_{in}$ Conversion of $H_2S$ to sulfur is calculated as $100\times(H_2S_{in}-H_2S_{out}-SO_2)/H_2S_{in}$ Here, $H_2S_{in}$ is the concentration of hydrogen sulfide in the inlet gas; $H_2S_{out}$ and $SO_2$ are the concentrations of hydrogen sulfide and sulfur dioxide in the effluent gas, respectively.

Table 1 illustrates how elemental sulfur, contained in the inlet gas stream entering the oxidation reactor, affects the ignition temperature of the hydrogen sulfide oxidation on the iron-zinc-oxide catalyst. Here the "ignition temperature" is the temperature at which about 5% of the amount of hydrogen sulfide contained in the inlet gas has reacted.

TABLE 1

| Sulfur vapor content, mg/l | 0.0 | 0.3 | 1.0 | 2.0 | 3.0 |
|---|---|---|---|---|---|
| Ignition temperature, ° C. | 155 | 160 | 166 | 173 | 179 |
| Sulfur dew point, ° C. | n/a | 115 | 130 | 142 | 151 |

The results clearly show that the ignition temperature of the catalytic oxidation of $H_2S$ depends on the sulfur content in the inlet gas. When the inlet gas is free from sulfur, the process starts at 155° C. The rise of the sulfur content in the initial gas stream increases the ignition temperature of the process. When the initial sulfur content is 3 mg/l, the oxidation starts at about 180° C. To shift the initial temperature of the process to the lower temperature area, the sulfur content in the initial gas stream should be less than 3 mg/l. In order to use the catalyst's potential fully, the sulfur content in the initial gases should be lower than 0.3 mg/l. Table 1 also shows that the complete inhibition of hydrogen sulfide oxidation on the iron-zinc-oxide (solid) catalyst occurs at temperatures of about 30-40° C. higher than the sulfur's dew point, that is, in the conditions when the condensation of sulfur vapors is not possible at all.

Table 2 demonstrates how the elemental sulfur formed in the process affects the oxidation of hydrogen sulfide on the iron-zinc-oxide catalyst at 220° C. In this set of experiments, the initial gas was free from elemental sulfur. The gas stream contained only the sulfur formed in the process.

TABLE 2

| $H_2S$ in the inlet gas, %% | Content in the effluent gas, %% | | Conversion of $H_2S$, %% | | Sulfur $S_n$ in the effluent gas, Pa | |
|---|---|---|---|---|---|---|
| | $H_2S$ | $SO_2$ | total | in sulfur | P | P/P$_s$ |
| 0.18 | 0.0 | 0.01 | ~100 | 94 | 22 | 0.04 |
| 0.48 | 0.0 | 0.02 | ~100 | 96 | 59 | 0.12 |
| 1.03 | 0.01 | 0.04 | 97 | 93 | 123 | 0.23 |
| 1.56 | 0.55 | 0.04 | 65 | 62 | 124 | 0.23 |
| 1.97 | 1.02 | 0.05 | 48 | 46 | 115 | 0.21 |

When the initial concentrations of hydrogen sulfide are low (0.18 and 0.48%) and, consequently, the relative pressure of the formed sulfur P/P$_s$ is low too (0.04 and 0.12), the rate of oxidation is high enough to provide full oxidation of hydrogen sulfide—its conversion is almost 100%. However, when the initial concentrations of $H_2S$ are higher (1.03, 1.56, and 1.97%) and, accordingly, the relative pressure of the formed sulfur vapor P/P$_s$ is more than 0.2, the rate of the catalytic oxidation of hydrogen sulfide declines significantly—its conversion drops to 48%. This means that the oxidation of hydrogen sulfide on the solid catalyst cannot continue when the relative pressure of sulfur vapor in the gas stream has reached some limit (0.21-0.23). This limit is about four times less than P/P$_s$ that is required for the condensation of sulfur vapors. By definition, condensation of vapors occurs when P/P$_s$=1.

Table 3 shows how elemental sulfur, contained in the inlet gas and formed in the process, affects the catalytic oxidation of hydrogen sulfide at 240° C.

TABLE 3

| Contents in the inlet gas | | Conversion of $H_2S$, % | | Sulfur $S_n$ content in the effluent gas, Pa | | |
|---|---|---|---|---|---|---|
| $H_2S$, % | $S_n$, mg/l | total | in sulfur | formed | total | P/P$_s$ |
| 1.05 | 0.00 | 100 | 95 | 128 | 128 | 0.12 |
| 1.02 | 2.14 | 99 | 94 | 123 | 143 | 0.13 |
| 0.99 | 9.21 | 89 | 87 | 110 | 196 | 0.18 |
| 1.05 | 23.3 | 22 | 21 | 28 | 248 | 0.22 |
| 1.02 | 33.5 | ~0 | ~0 | ~0 | 311 | 0.28 |

In these experiments, the initial concentrations of $H_2S$ are almost the same—about 1%, but sulfur content in the initial gas varies in the range from 0 to 33.5 mg/l. (Full oxidation of 1% $H_2S$ to $S_n$ gives about 14 mg/l of elemental sulfur)

In the first experiment, where the inlet gas does not contain sulfur, the whole amount of hydrogen sulfide is oxidized—the amount of the formed sulfur (about 14 mg/l) is not enough to significantly affect the process at 240° C. because P/P$_s$ remains much less than 0.25. In the second experiment, the elemental sulfur content in the inlet gas is 2.14 mg/l and amount of formed sulfur about 14 mg/l are also too low to significantly affect the process at 240° C. because P/P$_s$ also remains much less than 0.25. In the third and fourth experiments, the total sulfur contents in the gas stream (initial+formed) are enough to inhibit the process significantly—the hydrogen sulfide conversion decreases to 89 and 22%, respectively. In the last experiments, the initial sulfur content in the gas stream (33.5 mg/l) is high enough to prevent the oxidation of hydrogen sulfide from the very beginning because $P/P_s$ is 0.28, i.e., more than 0.25.

These data confirm once more that elemental sulfur vapors inhibit the catalytic oxidation of hydrogen sulfide on the solid catalysts. The reason for the inhibition is the adsorption of sulfur vapor on the solid catalysts, and the inhibition degree is determined by the relative pressure of sulfur vapor. It is known that the vapors are usually covered the solid adsorbents' surface with a monomolecular layer when the vapors' relative pressures are in the range of 0.1-0.3.

The presented laboratory's results help understand the performance of the Hi-Activity catalyst in the industrial oxidation reactor of the BSR/Selectox unit, which is described above in paragraph [0015].

If before entering the oxidation reactor the gas stream after the BSR reactor passes through the direct-contact quench tower, the inlet gas is completely freed from elemental sulfur, and the process in the reactor starts in the conditions without the sulfur inhibition; that is why in this case, the process starts at the temperatures as low as 155-160° C.

If before entering the oxidation reactor the gas stream bypasses (completely or partially) the direct-contact quench tower, the inlet gas contains elemental sulfur (remained in it after the hydrogenation reactor) in the amount that is enough to increase the initiation (ignition) temperature of the process in the oxidation reactor up to 200° C.;

The cooling coil in the Selectox reactor cools the gas stream in the reactor to the temperature at which $P/P_s$ becomes high enough (0.2-0.25) to stop the process in the bottom part of the reactor.

The notion of inhibition by sulfur also explained some anomalies of the Superclaus processes. The oxidation of hydrogen sulfide to elemental sulfur in this process is conducted on the iron-oxide- or iron-zinc-oxide-containing catalysts in the adiabatic reactors. As it was shown above, in the absence of the sulfur inhibition, the oxidation of hydrogen sulfide on these catalysts starts at 155-160° C. However, in the Superclaus process, the feed gases before the oxidation reactor (after the sulfur condenser) usually should be heated up to 200-220° C. The most likely reason of this disagreement is the sulfur remaining in the gas stream after the sulfur condensers.

The further analysis of the available data on the processes for recovery elemental sulfur from the $H_2S$-containing gases has revealed that the sulfur vapors inhibit not only the selective oxidation of hydrogen sulfide but also the catalytic hydrogenation of sulfur dioxide on the solid catalysts. The possible negative effluence of sulfur vapors on this process also was never considered and the adsorptive inhibition of these reactions by sulfur vapor was never mentioned in the patent and non-patent literature.

Now it is possible to evaluate the inhibitory effect of sulfur on the catalytic hydrogenation of sulfur dioxide, using the experimental data presented in U.S. Pat. No. 6,800,261. The hydrogenation of sulfur dioxide described in this patent was conducted in a tubular quartz reactor, with an internal diameter of 15 mm, on 4 cm³ of a commercial Co/Mo catalyst on alumina. The fresh catalyst contained 2.5 wt. % of CoO and 9 wt. % of $MoO_3$, based on the total weight of the catalyst. The B.E.T. surface area was 330 m²/g catalyst. The feed gas contained (in vol. %%): $H_2S$—0.83%, $SO_2$—0.074%, $H_2O$—30%, $H_2$—3.85%, and CO—1.35%. In test A, the feed gas did not contain sulfur vapor; in test B, sulfur vapor was added to the gas mixture so that the sulfur content in the feed was 1.64% (calculated as $S_1$). The feed gases contacted with the catalyst at 225° C. and space velocity 3,000 h⁻¹. Compositions of the effluent gases are shown in Table 4.

TABLE 4

| TESTS | Inlet gas, vol. %% | | | Effluent gas, vol. %% | |
|---|---|---|---|---|---|
| | Sulfur ($S_1$) | $H_2S$ | $SO_2$ | $H_2S$ | $SO_2$ |
| Test A | No sulfur | 0.83 | 0.074 | 0.89 | 0.00* |
| Test B | 1.64 | 0.82 | 0.076 | 1.20 | 0.080 |

*Below the detection level

In test A, when the inlet gas is free from sulfur, sulfur dioxide reacts completely. In test B, when the inlet gas contains sulfur vapors, the amount of sulfur dioxide in the gas stream does not decrease. It is likely that the partial pressure of sulfur vapors in this test is enough to inhibit the hydrogenation of $SO_2$ completely. Indeed, at 225.degree. C., the saturated vapor pressure of sulfur ($S_n$) is 0.667 kPa. The concentration of 1.64% of $S_1$ is equivalent to partial pressure of $S_n$ equal 0.22 kPa. It means that the relative vapor pressure of sulfur vapors in the inlet gas $P/P_s$=0.22/0.667=0.32. As it was shown above, such relative pressure of sulfur vapors is enough to cover the catalyst surface with a mono-molecular layer of sulfur completely and, consequently, to stop the catalytic reaction, in this case—the catalytic hydrogenation of sulfur dioxide.

I addition, Table 4 shows some increase in concentrations of $H_2S$ and $SO_2$ in Test B, which could be explained as the followings:

1. the adsorbed sulfur reacts with hydrogen and produces hydrogen sulfide;
2. the adsorbed sulfur catalyzes the reverse Claus reaction, proceeding in accordance with equation 4a.

$$3/nS_n + 2H_2O \leftrightarrow SO_2 + 2H_2S \qquad [4a]$$

The possibility of catalyzing the Claus reaction (both direct and reverse ones) by the adsorbed sulfur was never mentioned or discussed before. Nevertheless, this catalytic reaction is very important not only for the TGTU processes but also for the all so-called sub-dew-point Claus processes. Actually, the sub-dew-point Claus processes proceed because of catalytic activity of the adsorbed sulfur in the Claus reaction. Indeed, the sub-dew-point Claus processes, for example, such as Sulfreen, are conducted at the temperatures about 125-150° C. on the alumina catalysts with wide pores and large surface area. The elemental sulfur formed in the process remains in/on the catalyst. During the process, the formed sulfur gradually fills up the catalyst pores, which results in gradual contraction of the catalyst surface and reduction of the reaction rate. Therefore, the catalysts in this process are regularly regenerated by removing the formed sulfur at the elevated temperatures.

It is very likely that the accumulation of sulfur on/in the catalyst granules begins with formation of a mono-molecular layer of the adsorbed sulfur, which completely covers the catalyst's surface and isolates the alumina catalyst from the gas phase. In spite of this, the isolation of the catalyst, the Claus process continues, which is possible only if the adsorbed sulfur possesses some catalytic activity in the Claus reaction. Based on this consideration, the sub-dew-point processes could be considered as a convincing evidence of the catalytic activity of adsorbed sulfur in the Claus reaction (both direct and reverse). It should be kept in mind that the catalytic activity of sulfur in the Claus reaction does not mean that the sulfur must also be active in other reactions, for instance, in the oxidation of hydrogen sulfide or the hydrogenation of sulfur dioxide.

One more compelling proof of the catalytic activity of elemental sulfur in the Claus reaction is followed from the recommendation for the Claus reactors' temperatures. Based on the prodigious amount of the industrial data, one of the authoritative sulfur experts, Gene Goar in *Sulphur* magazine (*Sulphur*, March-April, 2011) states, "the temperature of the process gas out of a catalytic converter should be 20-25° F./11-14° C. higher than the sulfur dewpoint of the process gas stream." He does not offer any explanation of these magic numbers' origin. Nevertheless, they could be useful for verification of my conjecture about catalytic activity of the adsorbed sulfur. The calculations show that at the recommended temperatures the relative vapor pressure of sulfur ($P/P_s$) in the catalytic reactors (converters) is in the range of 0.6-0.7, which is greater than 0.25 and less than 0.75. As it was shown above, at the $P/P_s$ equal 0.2-0.3, the sulfur vapors completely cover the catalyst surface and isolate it from the gas stream. In such conditions, the maternal catalyst simply stops working, but the process continues, which is possible only if the formed sulfur is active in the Claus reaction. Neither in the cited paper nor in the literature on the Claus process, there are explanations of such seemingly paradoxical recommendations.

Meanwhile, these recommendations are useful in practice and are reasonably explained on the ground of my discovering of the catalytic activity of sulfur in the Claus reaction. The relative pressure of sulfur vapor in the Claus reactors might be higher than 0.25 because the adsorbed sulfur possesses certain catalytic activity in the Claus reaction. However, the relative pressure of sulfur vapor in the Claus reactors should not be greater than 0.75 because at $P/P_s>0.75$ the intensive capillary condensation of sulfur vapors happens, which results in fulfillment of the catalyst pores with liquid sulfur, contraction of the sulfur surface and, consequently, in dramatic plummet of the catalytic reaction rate.

As it was mention above, neither inhibitory effect nor catalytic activity of sulfur were recognized before the present invention. The lack of this knowledge was the main reason of the failures in the attempts to realize the PROClaus and EuroClaus processes in the industrial scales. Actually, those attempts happened to be just a vain effort to conduct two different reactions (the Claus reaction and the $SO_2$ hydrogenation) in one adiabatic reactor, which is not appropriate for a such combination. The sulfur formed in the Claus reaction inhibited the hydrogenation of sulfur dioxide. The heats of the reactions were not enough to diminish the inhibitory effect of the formed sulfur.

Based on the above consideration, the technical problems could be summarized as following:

Oxidation of hydrogen sulfide and hydrogenation of sulfur dioxide to elemental sulfur on the solid catalysts are often inhibited by adsorption of sulfur vapors on the catalysts, which hamper the successful proceeding of these processes;

The adsorbed sulfur not only inhibits the said reactions but also catalyzes the reverse Claus reaction, which prevents achievement of the full conversion of the hydrogen sulfide and sulfur dioxide into elemental sulfur.

Solution of the Problems

Because elemental sulfur is continuously formed in the process, the inhibition of the process with sulfur cannot be completely eliminated, but it can be significantly diminished. There are two principal ways to reach this goal:

1. To reduce the sulfur content in the gas stream as much as possible before it enters the catalyst bed;
2. To maintain $P/P_s$ in the catalyst bed below the certain limits.

Sulfur content in the inlet gas can be reduced by:
a) Condensing sulfur vapor at the temperatures as low as possible,
b) Extracting sulfur with special substances (absorbents or adsorbents),
c) Dilution of the inlet gas with a gas containing much less elemental sulfur.

In principal, all of these techniques could be used in implementations of the present invention but their efficiencies and feasibility are different.

Condensing technique is widely used in the chemical industry. For instance, in the modern sulfur recovery plants, sulfur vapors are usually removed from the process gases by cooling them in the sulfur condensers. But because the sulfur condensers are used not only for separation of the formed sulfur, but also for generation of steam, the temperature of the effluent gases, leaving the sulfur condensers, usually is 150-185° C. At these temperatures, the residual content of sulfur vapor ($S_n$) in the effluent gases is 3-12 mg/l, correspondently.

In addition, the gas streams after the regular sulfur condensers contain not only sulfur vapor; some extra amount of elemental sulfur remains in the gas streams in forms of microscopic liquid droplets (aerosol, fog, mist), and therefore, the total content of sulfur in the effluent gases is significantly greater. At least, this amount of sulfur is enough to elevate the initial temperature of the catalytic oxidation of $H_2S$ in the SuperClaus and EuroClaus processes to 200° C. The sulfur content in the effluent gas could be reduced by decreasing the temperature in the condenser, however, it is not recommended to be lower than 125° C., in order to avert possible plugging the condenser's tubes with solid sulfur (Paskall H. G. *Sulfur condenser function and problems areas*. Sulfur Recovery, pp. 2.85-2.97). Furthermore, even at 125° C., the amount of sulfur in the effluent gas is big enough to thwart beginning the $H_2S$ oxidation on a solid catalyst at the temperatures lower than 180° C. Additionally, in this case the sulfur condenser could not be used for generation of the steam of the needed pressure. Therefore, the removal of sulfur from the process gases by cooling them in the regular sulfur condensers is not enough to diminish the sulfur inhibitory effect on the process significantly. Theoretically, the acceptable level of sulfur in the gas stream could be reached using special, so-called "deep-cooling" condensers, which are working at the temperatures lower than the sulfur's freezing temperature (115° C.)., but for some reasons, these condensers have not been still widely used. At least, they have never been used for removing sulfur from a gas stream before it enters the oxidation reactor.

Figure 1:
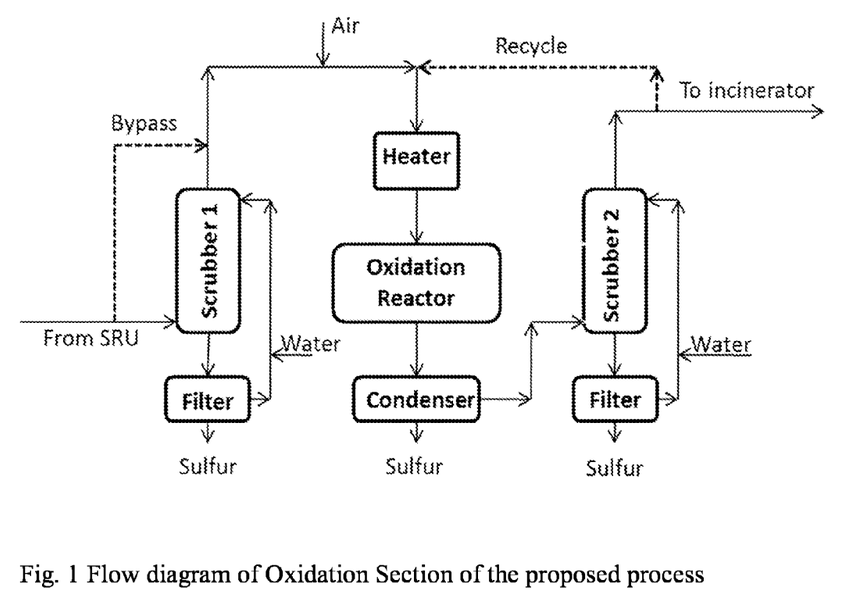
FIG. 1 elucidates the main idea of the invention, which is aimed at intensifying the sulfur recovery processes by removing elemental sulfur from the gas stream to minimize the inhibitory effect of elemental sulfur on the oxidation of hydrogen sulfide on the solid catalysts.

Among the known techniques for removing sulfur vapor and sulfur droplets from the gas stream, the most reliable one is washing (scrubbing) the gas stream with water or with some aqueous solutions—by this technique both vapor and liquid droplets can be removed completely. The washing procedures are easily realized in practice by using ordinary devices known as washing columns, scrubbers, washers, water towers, and so on, as it is shown in FIG. 1. The washing liquids are regenerated easily by widely used methods. In the past, the water towers were used for condensation both water and sulfur vapors of the effluent gases of the catalytic Claus reactors (for example, see U.S. Pat. No. 2,413,714, issued in 1947; U.S. Pat. No. 3,681,024, issued in 1972, and many others cited in the U.S. Pat. No. 4,953,221, issued on Jun. 19, 1990)

Water and aqueous solutions are quite acceptable liquids for this purpose because the water vapors practically do not affect the oxidation process on the iron-zinc-oxide catalysts. Therefore, the concentration of $H_2O$ in the gas stream might be as high as up to 50%. But if for some technical reasons it is necessary to have lower water content in the gas stream, this can be easily attained by changing the temperature in the scrubber. The washing technique could be used for removing all forms of elemental sulfur (vapor, fog, and mist) from the gas stream both before and after the oxidation reactor. Removing elemental sulfur from the gases after the oxidation reactor (actually, after the last sulfur condenser) makes these gases suitable for dilution of the gas stream entering the oxidation reactor. In addition, the washing the tail gas after the last sulfur condenser (after the oxidation reactor) could be combined with an extraction of sulfur dioxide from the tail gas. Such a complex, simultaneous extraction of both elemental sulfur and sulfur dioxide can be either reversible or irreversible. The elemental sulfur species can be removed with the same liquid in the same vessel or this can be done using different liquids and different vessels.

The third technique of reducing the sulfur content in the inlet gas is based on its dilution with a gas that is free from sulfur or at least contains less sulfur than the diluted gas. For this purpose, it is possible to use the tail gas of the TGTU (the gas after the oxidation of $H_2S$ and separation of sulfur from this gas) before its discharge into the atmosphere. In the sulfur industry, the dilution of the inlet gases before the oxidation reactors by recirculation of the tail gases is a well-known method. This method has been used for reduction of the concentration of hydrogen sulfide, but not for reduction of elemental sulfur and its inhibitory effect. A drawback of this method is an increase of the reactor load, which is proportional to the amount of the recirculating gas. To reduce the recirculation, the sulfur content in the diluting gas should be previously minimized.

As it was said in [0055], the second way to diminish the inhibitory effect of sulfur on the oxidation of $H_2S$ and hydrogenation of $SO_2$ on the solid catalysts is maintaining the relative vapor pressure of sulfur ($P/P_s$) in the catalytic reactor lower than 0.25. This requirement cannot be fulfilled if the initial concentrations of $H_2S$ and $SO_2$ are more than 1-2% and the said processes are conducted in the adiabatic reactors. In general, the properly designed reactor and correctly chosen conditions are one of the most important requirements for successful realization of the catalytic processes. The widespread implementation of the adiabatic reactors in the Claus units is possibly caused by the facts that the Claus process is not complicated by side reactions, is not inhibited by the sulfur, and is not very exothermic. At 250° C., the heat of the Claus reaction $\Delta H_4$ is about 40 kjoule. Moreover, the sulfur formed in this process is catalytically active in the same reaction, as it is found in this invention.

The catalytic processes of $H_2S$ oxidation and $SO_2$ hydrogenation are more complicated. They are described by the following thermochemical equations:

The process of the $H_2S$ oxidation (as it was shown above)

$$H_2S+1/2O_2=1/nS_n+H_2O+\Delta H_1 \quad [1]$$

$$H_2S+3/2O_2=SO_2+H_2O+\Delta H_2 \quad [2]$$

The process of the $SO_2$ hydrogenation $$SO_2+2H_2=2H_2O+1/nS_n+\Delta H_3 \quad [5]$$

$$SO_2+3H_2=2H_2O+H_2S+\Delta H_4 \quad [6]$$

The calculated free energies (Gibbs energies, $\Delta G$) and heats (enthalpy, $\Delta H$) of these reactions at 250° C. are (in kcal per mole of $H_2S$ or $SO_2$):

|  | $-\Delta G$ | $-\Delta H$ |
| --- | --- | --- |
| Reaction 1 | 41 | 50 |
| Reaction 2 | 113 | 124 |
| Reaction 5 | 30 | 42 |
| Reaction 6 | 39 | 51 |

All of these reactions are characterized with pretty large negative $\Delta G$, which means that all of these reactions are irreversible, and consequently, the conversion of the initial reactants ($H_2S$ or $SO_2$) can be as high as almost 100%, if the used catalysts are completely inactive in the Claus reaction and the inhibitory effect of sulfur is significantly suppressed. On the known catalysts, reactions 1 and 5 start at the lower temperatures than reactions 2 and 6. Therefore, the negative impact of reactions 2 and 6 are more notable at the higher temperatures.

As it was shown above, to diminish the inhibitory effect of the formed sulfur, its relative vapor pressure $P/P_s$ should be significantly less than 0.25. It is rather difficult to keep $P/P_s<0.25$ at the temperatures lower than 180° C. because at these temperatures $P_s<0.1$ kPa and the heat released by the reactions 1 and 5 is not enough to compensate the increase of P. Therefore, to diminish the inhibitory effect of sulfur at the lower temperatures (at the initial stage of the catalytic process) some additional amount of heat should be delivered to the initial reaction zone.

At the elevated temperatures (more than 220° C.), the requirement of $P/P_s<0.25$ is fulfilled easily because the saturated vapor pressure of sulfur $S_n$ in these conditions is reasonably high (at 220° C., $P_s=0.56$ kPa, that is about 60 mg/l) and $P_s$ is swiftly increasing during the process because of the high exothermicity of reactions 1 and 5. The heat released from these reactions could be even too much, so in order to prevent overheating of the catalyst zone and avoid reducing the selectivity of the processes, an excessive portion of the heat could be removed from this section of the reactor.

In the petrochemical industry, the exothermic processes (for example, such as production of some organic substances by selective oxidation of hydrocarbons), often are conducted in the multi-tubular reactors. These kinds of reactors are comprised of a shell and a plurality of reaction tubes placed in the shell. The tubes are packed with the granules of a catalyst, and a heat exchange medium circulates between tubes in the shell. These reactors have never been used in the TGTU units, but they could be successfully employed for the catalytic oxidation of $H_2S$ and reduction of $SO_2$ when their contents in the initial gases are about 2%.

The multi-tubular reactors are especially favorable for the selective oxidation of hydrogen sulfide when its concentration is much higher than 2%. For example, to profit the Super-Claus potentials fully, the concentration of $H_2S$ in the inlet gas of the oxidation reactor should be about 2%; the $H_2S$ concentration in the so-called "lean gases" that could be subjected to treatment by the catalytic oxidation reaches 20%. In these and similar cases, the rational heat redistribution in the reactor is extremely vital. For these purposes, a modified multi-tubular reactor of a special construction could be very advantageous.

Figure 2:
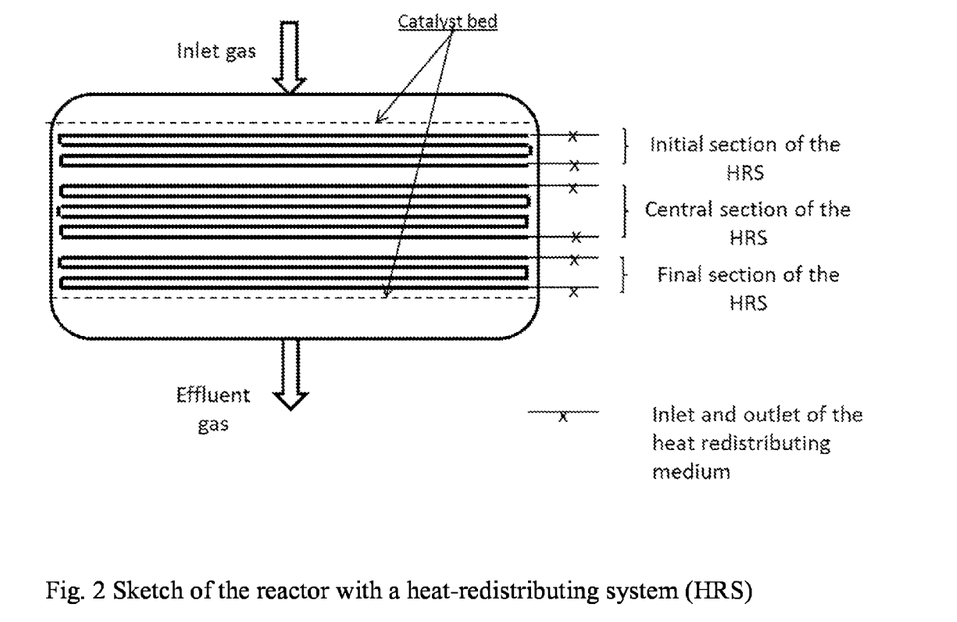
FIG. 2 shows a draft of a recommended reactor in which, because of its heat-redistributing system, it is easy to maintain the desirable relative vapor pressure of elemental sulfur (<0.25), in order to diminish the inhibitory effect of sulfur.

A schematic sketch of the proposed reactor is shown on FIG. 2. It is a cylindrical, horizontally positioned, fixed-bed catalytic reactor with a heat-redistribution system (HRS). The HRS consists of several sections completely or partially located in the catalyst bed, one after another along the process gas flow. The catalyst granules reside between the tubes of the HRS, and a heat-transfer medium circulates in the tubes. Each section of the HRS consists of one or several winding tubes connected with each other. The tubes are positioned across the gas stream in the reactor. The configurations and profiles of the tubes and the constructions of the sections should be designed so that they could maintain the optimal temperature profile in the catalyst bed. Each section has its own inlet and outlet, so they could work separately (individually) or they can be connected with each other and work consecutively. The flows of the heat-transfer medium in the sections (their directions and rates) can be different, which creates additional possibility to keep an optimal temperature profile in the reactor.

The main function of the initial section of the HRS is delivering some additional heat to the first catalyst zone to lessen the sulfur adsorption on the catalyst and to diminish its inhibitory effect. The function of the central section is removal of the excessive heat from the central zone of the catalyst bed in order to decrease the rate of the side reactions (reaction 2 and 4). The central section of the HRS might consist of several sub-sections, which creates better possibilities to control the temperature in the reactor. The final section of the HRS maintains the desired outlet temperature of the gas stream precisely in the given range.

Because the final and average temperatures of the process gas stream in the proposed reactor could be much lower than in the adiabatic reactor, the selectivity of the $H_2S$ oxidation to elemental sulfur is significantly higher than in the regular adiabatic reactors. In the case of the oxidation of $H_2S$ in the reactors with HRS, there is no necessity to keep initial content of $H_2S$ lower 3 mg/l. The reactors with HRS could be especially favorable for PROClaus and EuroClaus processes because in these reactors the inhibitory effect of the formed sulfur could be easily diminished by increasing the temperature in the bottom part of the reactor, in which the hydrogenation of sulfur dioxide should proceed.

Advantageous effects of the Invention consist in creating of the feasible possibilities
  To decrease the required initial temperature for selective oxidation of $H_2S$ in the adiabatic catalytic reactors to 155-160° C.;
  To increase the initial concentration of hydrogen sulfide in the inlet gas up to 1.8-2.0% by volume for the adiabatic oxidation reactors and up to about 10% by volume for the multi-tubular reactors, particularly for the reactor with the HRS;
  To conduct the hydrogenation of $SO_2$ concurrently with the Claus reaction in the same catalytic reactor.
The invention could be used both for upgrading the existing sulfur recovery plants and designing and constructing the new ones.

DESCRIPTION OF THE EMBODIMENTS

The present invention could be utilized in numerous ways. Some of the possibilities are shown in the examples given below, but the possible embodiments are not limited to these examples. The invention could be additionally used in the ways different from those described in the following examples.

In calculation of the shown processes' efficiencies, it is supposed that the following industrial catalysts are used:
  the iron-zinc-oxide catalyst, known as the Hi-Activity catalyst, for the selective oxidation of hydrogen sulfide;
  the regular cobalt-molybdenum-oxide catalyst for the hydrogenation of sulfur dioxide;
  the regular aluminum-oxide catalyst or/and titanium-oxide catalyst for the Claus reaction.

It is supposed that COS and $CS_2$, usually formed in the reaction furnace of the Claus plant, are destroyed practically completely in the first catalytic Claus reactor by the known methods, as described, for example, by Sames J. A. et al. in their two articles: *Evaluation of Reaction Furnace Variables in Modified-Claus Plants* and *So you don't have a $COS/CS_2$ problem*, both published in Sulfur Recovery, pp. 2.1-2.13 and 2.77-2.84.

EXAMPLE 1

This example describes the Oxidation Section that, in accordance with the present invention, is a vital segment of the sulfur recovery plant using the selective oxidation of hydrogen sulfide on the solid catalysts. The flow diagram of the Oxidation Section, shown in FIG. 1, illustrates the general idea of the invention—removal of elemental sulfur from the gas stream before its entering the catalytic reactor. According to the invention, elemental sulfur (its vapor, fog and mist) should be removed from the gas streams by any known and available technique providing reduction of the sulfur content to the level less than 3 mg/l, preferably 0.3 mg/l. For illustration, it is chosen a washing (scrubbing) technique because it is now more reliable and practical for removing sulfur from the gas stream.

The Oxidation Section includes one or two scrubbers, a heater, a fixed-bed oxidation reactor with the Hi-Activity catalyst, and a regular sulfur condenser. The $H_2S$ containing gas stream first passes through Scrubber 1, where it is completely freed from elemental sulfur (both its vapor and droplets) by being washed with water or an aqueous solution. If the initial gas stream contains less than 3 mg of sulfur per liter, it could partly or entirely bypasses the first scrubber.

After Scrubber 1, the gas stream is mixed with air of the amount sufficient not only to oxidize $H_2S$ completely, but also to prevent sulfurizing the Hi-Activity catalyst. Amount of the added air should not be excessive because a large excess of oxygen could decrease selectivity of the $H_2S$ oxidation to elemental sulfur. The recommended concentration of oxygen in the effluent gas for the iron-zinc-oxide catalysts is 0.3-0.6% (vol.)

The oxidation reactor shown in FIG. 1 is either a regular adiabatic reactor or a reactor with a heat-redistributing system, shown in FIG. 2. The maximum concentration of $H_2S$ in the inlet gas depends on the type of the reactor used. For adiabatic reactors, it is limited to 2.0% by volume. For the reactors with HRS, it might be much higher.

The mixed gas stream is heated to 155-160° C. and enters the Hi-Activity reactor, where the most amount of the $H_2S$ (95-96%) is oxidized to elemental sulfur; the rest of it (4-5%) is oxidized to $SO_2$. Therefore, the gas leaving the Hi-Activity reactor practically does not contain hydrogen sulfide; it contains only $SO_2$ and sulfur vapors. The largest portion of the sulfur formed in the oxidation reactor is removed from the gas stream in the sulfur condenser, and the residual portion is washed out in Scrubber 2. The extracted sulfur could be separated from the washing liquid by the known methods, for example, by filtration. The aqueous suspension of sulfur could be discharged to sewer, when this is permitted.

The only sulfur species contained in the gas stream leaving the Scrubber 2 is sulfur dioxide. Its concentration in the effluent gas is less than 0.2% (on dry basis). Such a tail gas might be vented to the atmosphere or additionally treated with some special chemicals to remove sulfur dioxide (reversibly or irreversibly) from the vented gas.

EXAMPLE 2

The invention could be successfully used in the so-called Shifted Claus Processes. "Shifted" means that the ratio of the concentrations of $H_2S$ and $SO_2$ in the process gas is greater than 2 (two), which is reached by suppression of the $SO_2$ formation in the reaction furnace. The idea to increase sulfur recovery in the Claus processes by the suppression of $SO_2$ formation in the reaction furnace was earlier described by Golyand S. M. et al. in their USSR Invention Certificate No. 239262, issued in 1969. The similar idea has been later used by Comprimo in the SuperClaus-99 process, protected by U.S. Pat. No. 4,988,494, filed in Apr. 13, 1987 and issued in Jan. 29, 1991. It is essential, that in the SuperClaus process, the selective oxidation of $H_2S$ is conducted in an adiabatic reactor and elemental sulfur is not specially removed from the inlet gas to diminish the inhibitory effect of sulfur.

Figure 3:
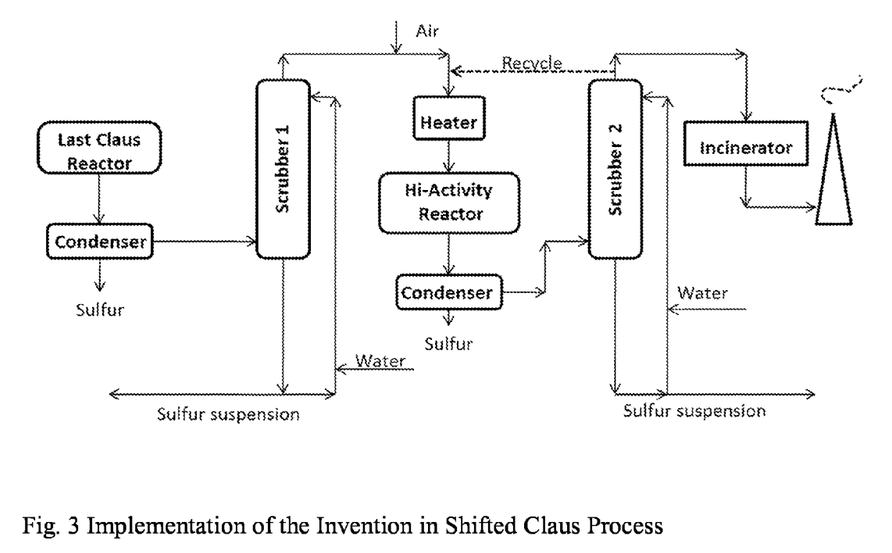

The implementation of the invention in the Shifted Claus Processes is shown in FIG. 3. The tail gas after a Sulfur Recovery Unit (SRU) enters the Oxidation Section. The SRU is a regular Claus plant with two or three catalytic reactors. The amount of air used for combustion of the acid gas in the thermal stage of the SRU is kept at the level that provides the ratio of $H_2S$ to $SO_2$ in the tail gas after the last Claus reactor significantly greater than 2 (two).

The calculation shows that the potential of this mode could be completely realized when the $H_2S:SO_2$ ratio in the inlet gas of the Hi-Activity oxidation reactor is in the range of 20-40 and the concentration of $H_2S$ is about 2% by volume. As it is mentioned above, in the SuperClaus process the allowable concentration of $H_2S$ in the inlet gas of the oxidation reactor is 0.8-1% by volume. Additionally, because the inlet gas in the SuperClaus process contains uncontrolled amount of sulfur, the initial oxidation temperature is about 200° C. In this condition, on the SuperClaus catalyst, the $H_2S$ oxidation to elemental sulfur is about 85%, and as a result, the total SRE of the Claus unit is not more than 99.0%.

All of these results become much better when elemental sulfur is previously removed from the inlet gas. In these cases, the $H_2S$ concentration in the inlet gas might be as high as 2%. In the presence of the Hi-Activity catalyst, about 95-96% of $H_2S$ is oxidized to elemental sulfur, which is then completely removed from the gas stream in the sulfur condenser and the second scrubber. As a result, the total SRE of the Claus unit is in the range 99.4-99.5%. The results could be further improved if a reactor with HRS is used.

EXAMPLE 3

Figure 4:
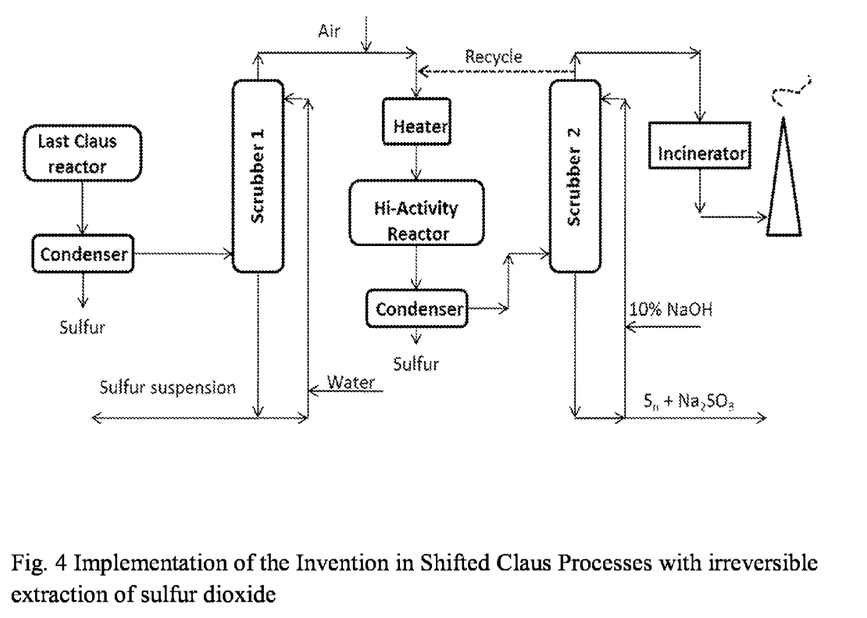

The efficiency of the process described in Example 2 could be substantially boosted by removal of the sulfur dioxide formed in the oxidation reactor, as shown in FIG. 4. In this case, almost all amounts of $H_2S$ are completely oxidized on the Hi-Activity catalyst (95-96% to elemental sulfur and 4-5% to sulfur dioxide) so that the residual concentration of $H_2S$ in the effluent gas drops to less than 50 ppm. This could be reached by the moderate increase of the temperature in the oxidation reactor. The formed $SO_2$ is absorbed with an aqueous solution with pH more than 7, for example, with an aqueous solution of sodium hydroxide (NaOH) or sodium carbonate ($Na_2CO_3$) in the last scrubber. Both of these compounds quickly interact with the dissolved sulfur dioxide, according to the following chemical equations:

$$SO_2 + H_2O = H_2SO_3$$

$$H_2SO_3 + 2NaOH = Na_2SO_3 + 2H_2O$$

$$H_2SO_3 + Na_2CO_3 = Na_2SO_3 + H_2O + CO_2$$

$$Na_2SO_3 + 1/2 O_2 = Na_2SO_4$$

The efficiency of removing sulfur dioxide from the waste gases by using these chemicals has been proved in industrial practice. The main advantage of this method is its ability to quickly and fully extract $SO_2$ from the gas streams. In this case, the overall SRE of the Claus plant is greater than 99.9%.

EXAMPLE 4

Some modern sulfur recovery plants include a catalytic hydrogenation/hydration (H/H) stage to convert sulfur dioxide and all other sulfur species of the Claus plants' tail gases into hydrogen sulfide. Most of the formed $H_2S$ is then selectively oxidized to elemental sulfur. This scheme is used, for example, in the BSR/Selectox, BSR/Hi-Activity, and Superclaus-99.5 processes. It is assumed that at the H/H stage elemental sulfur and all other sulfur compounds are completely transformed into $H_2S$. Therefore, for example, in the SuperClaus-99.5 process, elemental sulfur is not specially removed before the oxidation reactor. In reality, however, for some reasons (insufficient activity of the catalyst, inadequate conditions, steadily degradation of the catalyst), the gases after the H/H reactor contain notable amounts of sulfur and sulfur dioxide, which deteriorate performance of the oxidation stage. For example, the initial temperature of the $H_2S$ oxidation in the SuperClaus-99.5 process is about 200-210° C., instead of 160° C.

Figure 5:
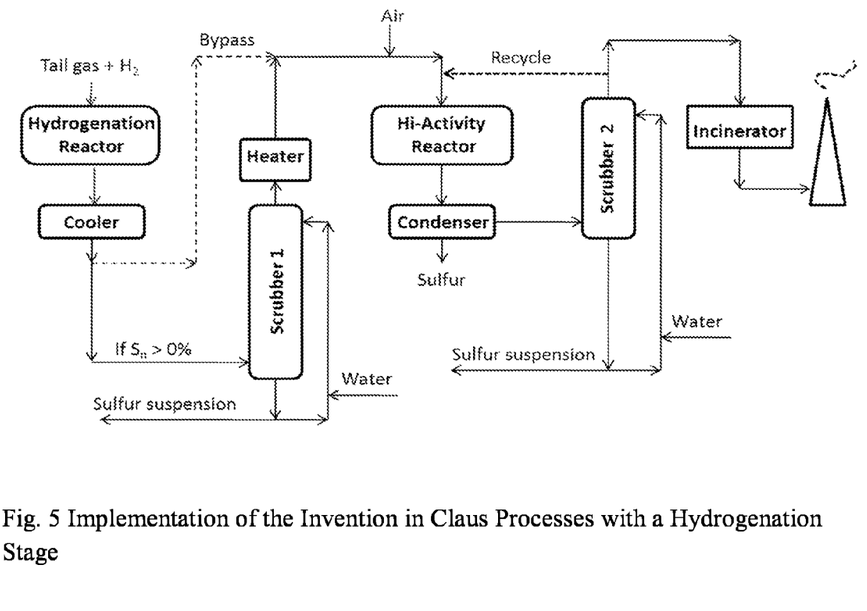

The present invention could solve this problem. The flow diagram of the proposed process with an H/H stage is shown in FIG. 5. In order to minimize the inhibitory effect of sulfur on the oxidation of $H_2S$ in the Hi-Activity reactor, the gas stream after the Hydrogenation reactor is freed from the residual amount of sulfur in Scrubber 1. When the effluent gas after the H/H reactor contains less than 3 mg/l of sulfur, the gas stream could partially or completely bypasses Scrubber 1 and the heater.

Before the oxidation reactor, the gas stream is mixed with the controlled amount of air and then enters the oxidation reactor at 155-160° C. In the presence of the Hi-Activity catalyst, most portion of hydrogen sulfide (95-96%) is oxidized to elemental sulfur and a relatively small, residual portion of it (4-5%) is oxidized to sulfur dioxide. The formed elemental sulfur is completely removed from the effluent gas in the sulfur condenser and the second scrubber. As a result, in the gas stream after the second scrubber, the only sulfur compound is sulfur dioxide. Its concentration is less than 0.1%, which means that overall sulfur recovery efficiency of the proposed process is 99.6-99.8%, which is higher than 99.5% in the SuperClaus-99.5 process.

EXAMPLE 5

Figure 6:
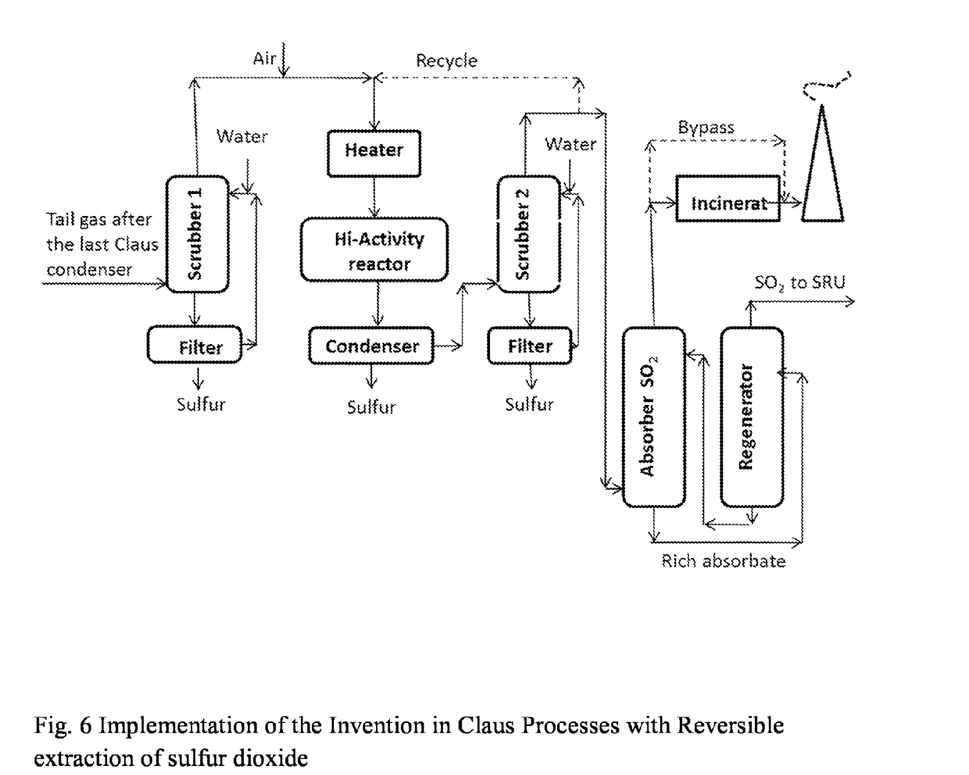
FIG. 6 demonstrates a new multistage sulfur recovery process, which comprises two or three Claus reactors, an oxidation section, and a reversible extraction of sulfur dioxide. The process provides SRE not less than 99.9% and could be a strong alternative to the processes that use amine extraction of hydrogen sulfide.

FIG. 6 illustrates a combination of the removal of sulfur from the gas stream, selective oxidation of hydrogen sulfide, and reversible absorption of sulfur dioxide. The overall SRE of this variation of the proposed process is higher than 99.9%. This process could become a strong alternative to the known amine based processes, for example, such as the BSR/Amine and SCOT processes.

The proposed process comprises three main sections: a Claus unit with two or three reactors, an Oxidation Section, and a section of $SO_2$ absorption/desorption. In the Claus unit, 94-97% of hydrogen sulfide of an acid feed gas is converted to elemental sulfur, which is mostly removed from the gas stream in the sulfur condensers. To minimize the $SO_2$ content in the tail gas, the Claus unit operates under the conditions of a slight deficit of oxygen, so that the ratio of $H_2S$ to $SO_2$ in the tail gas is kept in the range 10-40. In this case, depending on the SRE of the Claus unit, the tail gas contains $H_2S$ (up to 2%), $SO_2$ (<0.1%), and elemental sulfur. If the oxidation of $H_2S$ is conducted in a reactor with HRS, the tail gas might contain about 5% $H_2S$ and less than 0.01% $SO_2$.

In the Oxidation Section, the tail gas is first freed from elemental sulfur. Then it is heated up to 155-160° C. and enters the reactor with the Hi-Activity catalyst, where the almost whole amount of hydrogen sulfide is oxidized to elemental sulfur (95-96%) and sulfur dioxide (the rest portion). The produced sulfur is fully removed from the tail gas when it is passing consequently through the regular sulfur condenser and the second scrubber. As a result, the gas after the Oxidation Section contains only sulfur dioxide (<0.2%).

The sulfur dioxide is then removed from the tail gas by its absorption into an aqueous solution of sodium phosphate or sodium citrate. These absorption liquids have been used for many decades and proved their feasibility. For example, sodium phosphates were used for the extraction of sulfur dioxide from a gas stream in Aquaclaus process, which has been known more than 50 years. The use of these salts for the extraction of sulfur dioxide was described even earlier in U.S. Pat. Nos. 2,563,437 and 2,729,543, issued in 1950s, as it is described in the Background for the U.S. Pat. No. 3,983,225 issued in the 1976.

The absorption of sulfur dioxide with sodium phosphates solutions brings the residual content of $SO_2$ in the gas stream to less than 50 ppm. The "enriched" absorption liquid is easily regenerated in a regenerator by mild heating, and the "lean" absorption liquid is returned back for reuse. Because the gas stream enters the absorber after passing through the second scrubber, its temperature and the concentration of water vapor in it could be as low as it is necessary for optimal interaction of $SO_2$ with sodium salts. In addition, because the gas is free from elemental sulfur, the foam formation is minimized.

EXAMPLE 6

The invention can be profitably used in realization of the EuroClaus and PROClaus processes. As it was discussed above, the both EuroClaus and PROClaus processes were failed mainly because the adiabatic reactors used for these combined processes did not fit them. In the adiabatic reactors, the elemental sulfur formed in the Claus reaction strongly inhibited the hydrogenation (reduction) of sulfur dioxide because the heat of the reactions was not enough to heat-up the gas stream and prevent the inhibition.

In the reactor with HRS (see FIG. 2) the Claus reaction proceeds in the upper part of the reactor at the same temperatures as in the usual Claus reactor. In the bottom part of the reactor, containing the reduction catalyst, the required additional heat is delivered by the HRS. Because of this, the temperature in the bottom part of the reactor increases to the level that is enough to diminish the inhibition by sulfur. It is clear that the catalyst used in the bottom part of the reactor should be significantly more active in the hydrogenation (reduction) of sulfur dioxide than in the Claus reaction.

EXAMPLE 7

Figure 7:
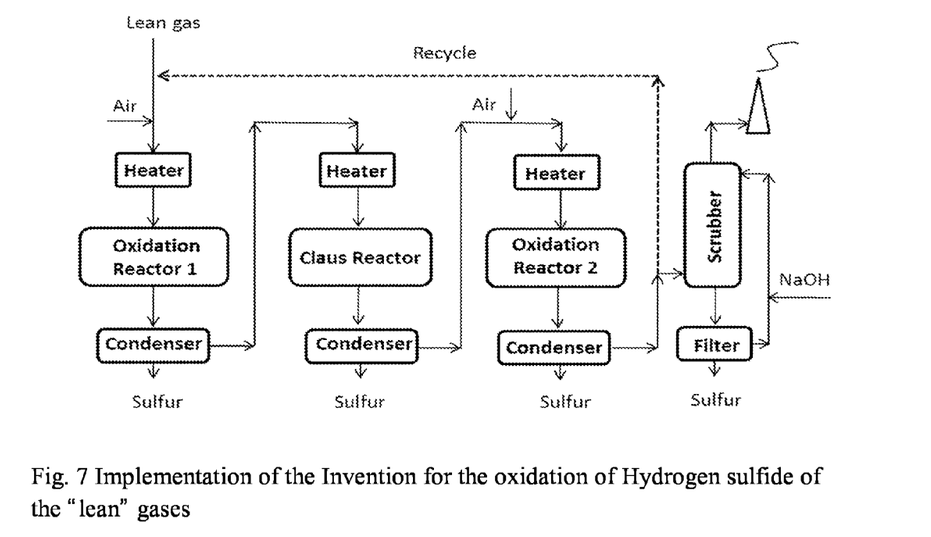
FIG. 7 demonstrates a process of hydrogen sulfide oxidation of the lean gases with elevated concentration of hydrogen sulfide (up to 10% by volume).

One of the possible flow diagrams of the process for selective oxidation of hydrogen sulfide of the lean gases is shown in FIG. 7. The lean gases usually do not contain elemental sulfur, so the first scrubber in this case is not necessary. When the lean gas contains more than 2% of $H_2S$, the oxidation reactor should be equipped with a heat-redistributing system (HRS). Amount of the air admixed to the lean gas and the temperature in the oxidation reactor provide about 90% oxidation of $H_2S$ and $H_2S/(SO_2+O_2)$ ratio in the effluent gas more than 2 (two). The Claus reactor contains a titanium-oxide or Selectox catalyst, and here a "shifted" mode of the Claus reaction proceeds, as it is described in Examples 2 and 3.

When the inlet gas contains more than 10% of $H_2S$, it should be diluted with the gas taken after the second oxidation reactor so that the concentration of $H_2S$ in the inlet gas of the first oxidation reactor does not exceed 10%.

The described examples show that the invention could be easily implemented in the sulfur industry, using contemporary equipment and techniques. It could be used for upgrading the existing sulfur recovery plants and also in designing and construction of the new ones.

CITATION LIST

Patent Literature, U.S. Patents

| | | |
|---|---|---|
| 3,911,093 | Sherif F. G. | Oct. 7, 1975 |
| 3,983,225 | Brocklin V., et al. | Sep. 28, 1976 |
| 4,374,819 | Patilla F. C. et al. | Feb. 22, 1983 |
| 4,519,992 | Alkhazov T. G. et al. | May 28, 1985 |
| 4,519,994 | Smallheister L. A. | May 28, 1985 |
| 4,576,925 | Alkhazov T. G. et al. | May 18, 1986 |
| 4,818,740 | Berben P. H. et al. | Apr. 4, 1989 |
| 4,886,649 | Ismagilov Z. R. et. al | Dec. 12, 1989 |
| 4,935,221 | Bronfenbrener J. C. | Jun. 19, 1990 |
| 4,988,494 | Lagas, et al. | Jan. 29, 1991 |
| 5,512,260 | Kiliant T. R. | April, 1996 |
| 5,597,546 | Li K-T. | Jan. 28, 1997 |
| 5,603,913 | Alkhazov T. G. et al. | Feb. 18, 1997 |
| 5,700,440 | Li K-T. | Dec. 23, 1997 |
| 5,891,415 | Alkhazov T. G. et al. | Apr. 6, 1999 |
| 5,965,100 | Khanmamedov T. K. | Oct. 12, 1999 |
| 6,017,507 | Nougayrede L. | Jan. 25, 2000 |
| 6,083,473 | Esquivel J. M. D. | Jul. 4, 2000 |
| 6,099,819 | Srinivas | Aug. 8, 2000 |
| 6,207,127 | Geus J. W. et al. | Mar. 27, 2001 |
| 6,506,356 | Chung J. S. | Jan. 14, 2003 |
| 6,919,296 | Geus J. W. | Jul. 19, 2005 |

Non Patent Literature

Alkhazov T. G. et al., "About Catalytic Oxidation of Hydrogen Sulfide of Natural Gas," *Oil and Gas,* 1979, No 2, 41-44.

Alkhazov T. G. et al., Sulfur *Compounds of Natural Gases and Oils*, "Nedra", Moscow, 1989

Borsboom J. et al. *Unconventional Cooling of the Tail Gas in Sulfur Plants by a New "Deep Cooler"*, Gas Conditioning Conference, 1996

Brink, P. J. van den, *The Selective Oxidation of Hydrogen Sulfide to Elemental Sulfur on Supported Iron-Based Catalysts*, Utrecht: University Utrecht, 1992

Goar B. G., "The Sulfur Doctor", *Sulfur,* 332, March-April, 2011, pp. 10-11

Jacobs Comprimo Introduces EuroClaus. *Sulfur*, No 270, 65-72, September-October 2000.

Jacobs Engineering; Providers of Professional, Technical and Construction Services, EUOROCLAUS, http://www.jacobs.com/products.aspx?id=6304 (accessed Jun. 19, 2011)

Jacobs Engineering; Providers of Professional, Technical and Construction Services, SUPERCLAUS, http://www.jacobs.com/products.aspx?id=6292 (accessed Jun. 19, 2011)

Kohl A. L. et al., *Gas Purification*, 5th ed. Gulf Publishing Co., Houston, Tex., 1997, pp. 670-731

Kwong K. V. and el., *Parsons Hi-Activity Process*, Sulfur Conference, Tampa, Fla., Nov., 6-9, 1994

Kwong K. V. *PROClaus Process: An Evolutionary Enhancement to Claus Performance*, Laurence Reid Gas Conditioning Conference, The University of Oklahoma, Norman, Okla., Feb. 27-Mar. 1, 2000

Maddox R. N. et al. *Gas Conditioning and Processing*, vol. 4: Gas Treating and Sulfur Recovery, 4th ed. Campbell Petroleum Series, Norman, Okla., 2006.

Migalio A. et al., *Improved Catalyst and Performance Testing*, Sulfur, 330, September-October, 2010, pp. 33-36.

Paskall H. G. et al. *Sulfur Recovery*, 13th ed. Sulfur Experts, Western Research, 2011

Scheel F. et al. *Innovative Approach to Sulfur Recovery Unit Emission Reduction*, SOGAT Conference Paper, pp. 1-14.

Ting P. et al., *New Sulfuric Acid Process from China*, Sulfur, 327, March-April, pp. 44-47

I claim:

1. A process for conversion of hydrogen sulfide into elemental sulfur comprising oxidation of hydrogen sulfide with oxygen in a gas stream on a solid catalyst in a fixed-bed oxidation reactor and additionally comprising at least one of the following stages: catalytic Claus reaction; catalytic hydrogenation of sulfurous compounds; removing elemental sulfur from the gas; recycling a part of the gas stream after the oxidation reactor in front of the oxidation reactor; removing sulfur dioxide from the gas stream after the oxidation reactor by its reversible or irreversible absorption into an aqueous solution; said process in which, to minimize the inhibitory effect of sulfur and to reduce the initiation temperature of the catalytic oxidation of hydrogen sulfide, the elemental sulfur content in the gas stream before, or after, or before and after the oxidation reactor is lessened so that the total concentration of all forms of elemental sulfur in the gas stream does not exceed 3.0 mg of sulfur per liter of the gas calculated for the standard conditions.

2. The process of claim 1 wherein the total concentration of all forms of elemental sulfur in the said gas stream does not exceed 0.3 mg of sulfur per liter of the gas calculated for the standard conditions.

3. The process of claim 1 wherein the gas stream is a tail gas after the last stage of catalytic Claus reactions.

4. The process of claim 1 wherein the gas stream is a gas stream after a stage of catalytic hydrogenation of sulfurous compounds.

5. The process of claim 1 wherein the sulfur content in the gas stream is reduced to the said level by scrubbing it with water or an aqueous solution with pH higher than 7.

6. The process of claim 1 wherein the sulfur content in the gas stream before the oxidation reactor is reduced to the said level by cooling it to the sub-freezing temperature of sulfur.

7. The process of claim 1 wherein the sulfur content in the gas stream before the oxidation reactor is reduced to the said level by its dilution with the recycling gas after the oxidation reactor.

8. The process of claim 1 wherein the solid catalyst comprises oxides of iron and zinc and the products of their interactions, and the catalyst can comprise a support that is practically inactive in the Claus reaction.

9. The process of claim 1 wherein the concentration of oxygen in the gas stream is sufficient for both oxidizing whole amount of hydrogen sulfide in the gas stream and preventing the catalyst from its sulfurizing.

10. The process of claim 1 wherein the concentration of oxygen in the effluent gas stream after the oxidation reactor is in the range 0.3-1.0% by volume.

11. The process of claim 1 wherein sulfur dioxide is removed from the effluent gas stream after the oxidation reactor by its absorption into an aqueous solution of sodium hydroxide or sodium carbonate.

12. The process of claim 1 wherein sulfur dioxide is removed from the effluent gas stream after the oxidation reactor by its reversible absorption into an aqueous solution of sodium phosphate or sodium citrate.

13. A process for conversion of hydrogen sulfide into elemental sulfur comprising oxidation of hydrogen sulfide with oxygen in a gas stream on a solid catalyst in a fixed-bed oxidation reactor and additionally comprising at least one of the following stages: catalytic Claus reaction; catalytic hydrogenation of sulfurous compounds; removing elemental sulfur from the gas; recycling a part of the gas stream after the oxidation reactor in front of the oxidation reactor; removing sulfur dioxide from the gas stream after the oxidation reactor by its reversible or irreversible absorption into an aqueous solution; said process in which, to minimize the inhibitory effect of sulfur, the oxidation of hydrogen sulfide is conducted in the reactor equipped with a heat-redistributing system that maintains the relative pressure of sulfur vapor in the said catalytic reactor at the level lower than 0.25.

14. The process of claim 13 wherein the relative vapor pressure of sulfur in the said catalytic reactor with a heat-redistributing system does not exceed 0.1.

15. A process of claim 13 in which the heat-redistributing system of the reactor consists of several sections that can work individually.

16. A process of claim 13 in which the tubes of the heat-redistributing system are positioned across the gas stream.

17. A process of claim 13 in which the sections of the heat-redistributing system are completely or partially located in the catalyst bed.

18. A process for conversion of hydrogen sulfide into elemental sulfur comprising oxidation of hydrogen sulfide with oxygen and hydrogenation of sulfur dioxide in gas stream on solid catalysts in fixed-bed reactors and additionally comprising at least one of the following stages: catalytic Claus reaction; removing elemental sulfur from the gas stream; recycling a part of the gas stream after the oxidation reactor in front of the oxidation reactor; removing sulfur dioxide from the gas stream after the oxidation reactor by its reversible or irreversible absorption into an aqueous solution; said process in which, to minimize the inhibitory effect of sulfur, the catalytic hydrogenation of sulfur dioxide is conducted in the reactor equipped with a heat-redistributing system that maintains the relative pressure of sulfur vapor in the said catalytic reactor at the level lower than 0.25.

19. A process of claim 18 in which the relative vapor pressure of sulfur in the said catalytic hydrogenation reactor does not exceed 0.1.

20. A process of claim 18 in which the last catalytic Claus reaction and the catalytic hydrogenation of sulfur dioxide are conducted in the same, single reactor equipped with the heat-redistributing system.

* * * * *